US012781683B1

(12) United States Patent
Kalita et al.

(10) Patent No.: US 12,781,683 B1
(45) Date of Patent: Nov. 3, 2026

(54) VALVE FAILURE DETECTION SYSTEM FOR DUAL FUEL ENGINE

(71) Applicant: Caterpillar Inc., Peoria, IL (US)

(72) Inventors: Bhaben Kalita, Peoria, IL (US); Isaac E. Fox, Houston, TX (US); Prasanna M. Ballal, Dunlap, IL (US); Manuj Dindgur, Peoria, IL (US); Arvind Sivasubramanian, Chicago, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 19/198,668

(22) Filed: May 5, 2025

(51) Int. Cl.
*F02D 41/22* (2006.01)
*F02D 19/02* (2006.01)
*G01M 15/09* (2006.01)

(52) U.S. Cl.
CPC ........... *F02D 41/22* (2013.01); *F02D 19/027* (2013.01); *G01M 15/09* (2013.01); *F02D 2041/224* (2013.01); *F02D 2200/0602* (2013.01)

(58) Field of Classification Search
CPC .. F02D 41/22; F02D 19/027; F02D 2041/224; F02D 2200/0602; G01M 15/09
See application file for complete search history.

(56) References Cited

U.S. PATENT DOCUMENTS

| | | | |
|---|---|---|---|
| 9,528,463 B2 | 12/2016 | Stoll et al. | |
| 10,859,012 B2 | 12/2020 | Koo | |
| 10,859,025 B2 | 12/2020 | Trzeciak et al. | |
| 10,934,948 B2 | 3/2021 | Engfehr et al. | |
| 11,242,816 B1 * | 2/2022 | Jenks | F02D 41/22 |
| 11,352,965 B2 | 6/2022 | Ballal et al. | |
| 2008/0103676 A1 * | 5/2008 | Ancimer | F02M 21/0245 701/103 |
| 2013/0013256 A1 | 1/2013 | Saito et al. | |
| 2014/0311451 A1 * | 10/2014 | Fang | F02M 21/0281 123/445 |
| 2014/0331962 A1 * | 11/2014 | Stockner | F02D 19/0623 123/304 |
| 2015/0113960 A1 * | 4/2015 | Ruth | F01N 3/206 73/40.5 R |
| 2015/0192450 A1 * | 7/2015 | Leone | F02D 19/08 701/102 |
| 2015/0198118 A1 * | 7/2015 | Leone | F02D 41/0025 123/445 |
| 2020/0271068 A1 * | 8/2020 | Dodis | F02D 41/20 |
| 2021/0115859 A1 * | 4/2021 | Ballal | F02D 19/027 |

FOREIGN PATENT DOCUMENTS

| | | | |
|---|---|---|---|
| JP | 5074966 B2 | 11/2012 | |
| WO | WO-2023147653 A1 * | 8/2023 | G05D 16/2097 |

* cited by examiner

*Primary Examiner* — Joseph J Dallo

(57) ABSTRACT

An engine system includes an engine configured to operate with a gaseous fuel, an intake manifold configured to provide intake air to the engine, and a gaseous fuel pathway including a gaseous fuel rail, a gaseous fuel shutoff valve, and a gaseous fuel check valve. The engine system also includes a gaseous fuel rail pressure sensor, an intake manifold pressure sensor, and a controller configured to: receive a measured gaseous fuel rail pressure from the gaseous fuel rail pressure sensor, receive a measured intake manifold pressure from the intake manifold pressure sensor, and based on the measured gaseous fuel rail pressure, the measured intake manifold pressure, and an expected pressure value, output an indication of a failure of the gaseous fuel shutoff valve or the gaseous fuel check valve.

20 Claims, 3 Drawing Sheets

VALVE FAILURE DETECTION SYSTEM FOR DUAL FUEL ENGINE

TECHNICAL FIELD

The present disclosure relates generally to detecting failure of a valve, and, more particularly, detecting failure of a valve in a gaseous fuel path of an engine system.

BACKGROUND

Dual fuel engine systems include an engine, e.g., an internal combustion engine, configured to run on two different types of fuels. In some systems, the engine is configured to run on a liquid pilot fuel, such as diesel fuel, and a gaseous main fuel, such as natural gas. Dual fuel engine system can be configured to operate in multiple modes, such as a mode in which only the liquid fuel is provided to the engine, and a mode in which both the liquid fuel and the gaseous fuel are provided to the engine. Dual fuel engine systems typically include a gas shutoff valve (GSOV) to control the supply of the gaseous fuel to the engine, as well as a check valve to prevent flow of air or other gases upstream in the gaseous fuel supply.

If the GSOV fails, the system can lose the ability to precisely control the quantity of gaseous fuel provided to the engine, which can negatively impact engine performance. If the check valve fails, it might be possible for air or other gases to leak toward the gaseous fuel supply. Existing systems do not consistently identify valve failures and are unable to differentiate between GSOV failures and check valve failures.

U.S. Patent Application Publication No. 2013/0013256 A1 ("the '256 publication") to Yoshio et al. describes a shutoff valve fault diagnosis device. The device described in the '256 publication performs fault diagnosis based on pressure measurements. In particular, the device determines that a shutoff valve has faulted based on pressure measurements from a sensor downstream of the shutoff valve. The system described in the '256 publication is unable to identify faults in fuel systems that include check valves and shutoff valves.

Embodiments of the present disclosure may solve one or more of the problems set forth above and/or other problems in the art. The scope of the protection provided by the present disclosure, however, is defined by the attached claims, and not by the ability to solve any specific problem.

SUMMARY

In one aspect, an engine system may include an engine configured to operate with a gaseous fuel, an intake manifold configured to provide intake air to the engine, and a gaseous fuel pathway including a gaseous fuel rail, a gaseous fuel shutoff valve, and a gaseous fuel check valve. The engine system may also include a gaseous fuel rail pressure sensor, an intake manifold pressure sensor, and a controller configured to: receive a measured gaseous fuel rail pressure from the gaseous fuel rail pressure sensor, receive a measured intake manifold pressure from the intake manifold pressure sensor, and based on the measured gaseous fuel rail pressure, the measured intake manifold pressure, and an expected pressure value, output an indication of a failure of the gaseous fuel shutoff valve or the gaseous fuel check valve.

In another aspect, a method for detecting failure of a valve of a gaseous fuel pathway for an internal combustion engine may include receiving a measured gaseous fuel rail pressure of a gaseous fuel rail, receiving a measured intake manifold pressure of an intake manifold connected downstream of the gaseous fuel rail, and determining an actual pressure difference between the measured gaseous fuel rail pressure and the measured intake manifold pressure. The method may further include comparing the actual pressure difference to an expected pressure difference and outputting an indication of a failure of the valve of the gaseous fuel pathway based on the comparison of the actual pressure difference to the expected pressure difference.

In yet another aspect, an engine system may include an engine configured to operate with a gaseous fuel and a liquid fuel and a gaseous fuel pathway configured to convey the gaseous fuel to the engine via an intake manifold, the gaseous fuel pathway including: a gaseous fuel rail, a gaseous fuel shutoff valve (GSOV) configured to reduce an amount of the gaseous fuel provided to the engine from a gaseous fuel supply via the gaseous fuel rail, and a check valve configured to allow the gaseous fuel to flow downstream from the gaseous fuel rail to the intake manifold and to prevent the gaseous fuel from flowing upstream from the intake manifold to the gaseous fuel rail. The engine system may also include a controller configured to detect and output an indication of a failure of the GSOV or the check valve, the controller configured to detect the failure when the engine system operates while commanding the GSOV to remain in a closed position for operation using the liquid fuel.

BRIEF DESCRIPTION OF THE DRAWINGS

The accompanying drawings, which are incorporated in and constitute a part of this specification, illustrate various exemplary aspects of the disclosure, and, together with the description, explain principles of the disclosure.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. As used herein, "based on" is intended to encompass "based, at least in part, on" unless explicitly stated otherwise.

Figure 1:
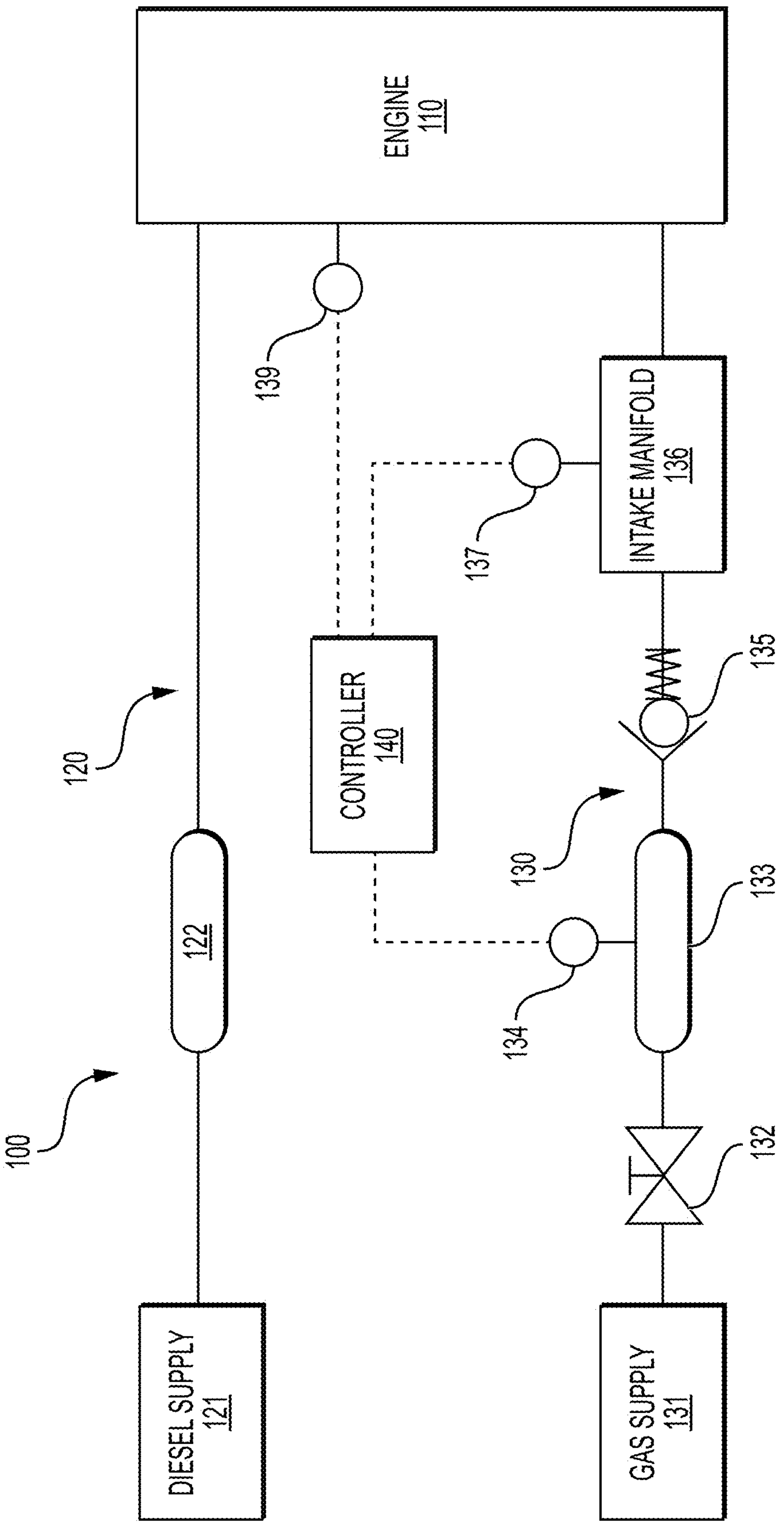
FIG. 1 depicts a schematic diagram of an exemplary dual fuel engine system.

FIG. 1 depicts a schematic diagram of an exemplary dual fuel engine system 100. The dual fuel engine system 100 may include an engine 110, e.g., an internal combustion engine, configured to operate on two different types of fuels, e.g., a liquid fuel and a gaseous fuel, separately or simultaneously. The liquid fuel may include any appropriate type of liquid fuel, such as diesel fuel, gasoline, methanol, ethanol, etc., that is provided to fuel injectors (not shown) while in a liquid state. The gaseous fuel may be any appropriate type of gaseous fuel, such as natural gas, propane, biogas, landfill gas, hydrogen, etc., that is provided to fuel injectors or admission valves while in a gaseous state. It will be understood that the engine 110 of the dual fuel engine system 100 may operate on only the liquid fuel (e.g., in a diesel fuel only mode), only the gaseous fuel, or both the liquid fuel and the gaseous fuel at once. When the engine 110 operates on both fuels, the liquid fuel may act as a pilot fuel that combusts the gaseous fuel, the gaseous fuel acting as the main or primary fuel that generates most of the energy of combustion.

As depicted in FIG. 1, the dual fuel engine system 100 may include a liquid fuel pathway 120 and a gaseous fuel pathway 130. The liquid fuel pathway 120 is configured to provide liquid fuel to the engine 110 of the dual fuel engine system 100. The liquid fuel pathway 120 may include components appropriate for providing a liquid fuel to the engine 110. For example, the liquid fuel pathway 120 may include a liquid fuel supply 121 (e.g., a fuel tank or other storage device) and a liquid fuel rail 122. The liquid fuel pathway 120 may also include one or more fuel pumps, fuel filters, and supply lines for providing the liquid fuel from the liquid fuel supply 121 to the engine 110 via the liquid fuel rail 122.

The gaseous fuel pathway 130 is configured to provide a gaseous fuel to the engine 110 of the dual fuel engine system 100. As depicted in FIG. 1, the gaseous fuel pathway 130 may be configured to provide gaseous fuel to the engine 110 via an intake manifold 136 in fluid communication with the engine 110. The gaseous fuel pathway 130 may include components appropriate for providing gaseous fuel to the engine 110. For example, the gaseous fuel pathway 130 may include a gaseous fuel supply 131 (e.g., a fuel tank or other storage device), a gas shutoff valve (GSOV) 132, a gaseous fuel rail 133, and a check valve 135. The GSOV 132 may be configured to modulate an amount of the gaseous fuel provided from the gaseous fuel supply 131 to the gaseous fuel rail 133 and to the engine 110. The check valve 135 may be configured to permit the gaseous fuel to flow in one direction, e.g., downstream from the gaseous fuel rail 133 to the intake manifold 136, and to prevent the gaseous fuel, or air, from flowing in the opposite direction, e.g., upstream from the intake manifold 136 to the gaseous fuel rail 133. Check valve 135 may include any appropriate type of check valve, such as a ball valve, a disc valve, a diaphragm valve, etc.

The dual fuel engine system 100 may further include a sensor system. The sensor system may include one or more pressure sensors, such as a gaseous fuel rail pressure sensor 134 configured to measure a gaseous fuel rail pressure of the gaseous fuel rail 133 and an intake manifold pressure sensor 137 configured to measure an intake manifold pressure of the intake manifold 136. The sensor system may include one or more other sensors, such as ambient temperature or gaseous fuel temperature sensors, one or more engine conditions sensors 139 (e.g., an engine speed sensor), additional pressure sensors, and sensors associated with the supply of diesel fuel (e.g., a pressure sensor for fuel rail 122).

The dual fuel engine system 100 may further include a controller 140, such as an electronic control module (ECM), configured to control one or multiple functions of the dual fuel engine system 100. The controller 140 may receive measured gaseous fuel rail pressures 106 (FIG. 2) from the gaseous fuel rail pressure sensor 134 and measured intake manifold pressures 104 (FIG. 2) from the intake manifold pressure sensor 137.

As used herein, the term "controller" or "ECM" may refer to one or multiple physical devices. When the controller or ECM is implemented as multiple devices, two or more of the devices that form the controller or ECM may be in electronic communication with each other, may be included in multiple housings, or may be included in a single housing. In some aspects, the controller or ECM may be implemented on a machine that includes engine system 100. In other aspects, the controller or ECM is at least partially implemented off-board or remotely from the machine that includes engine system 100 (e.g., via one or more supervisory machines configured to monitor operation of a plurality of engine systems 100).

Figure 2:
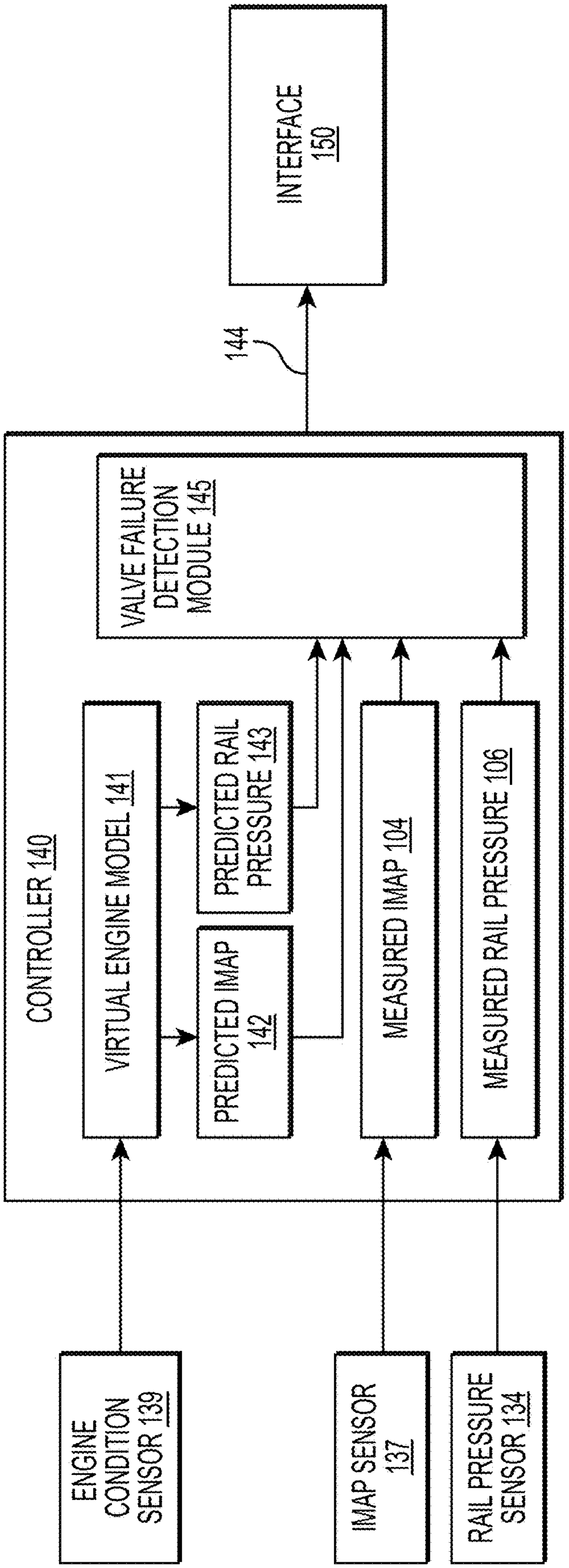
FIG. 2 depicts a block diagram of an exemplary controller for the dual fuel engine system of FIG. 1.

FIG. 2 depicts a block diagram of an exemplary configured of the controller 140 for the dual fuel engine system 100. The controller 140 may include at least one processor and at least one memory including instructions (e.g., software) that, when executed, cause the at least one processor to perform any of the valve failure detection functions described herein, such as the functions of a valve failure detection module 145 and the functions of the method 300 described below and depicted in FIG. 3. The controller 140 may embody a general machine controller capable of controlling any or all functions of a machine including the dual fuel engine system 100.

As mentioned above, the controller 140 may be configured to receive measured gaseous fuel rail pressure 106 measured by the gaseous fuel rail pressure sensor 134 and measured intake manifold pressure 104 measured by the intake manifold pressure sensor 137. As shown in FIG. 2, the controller 140 may include a virtual model 141 of the dual fuel engine system 100. The virtual model 141 may be part of a multi-input, multi-output (MIMO) system that uses modelling techniques (e.g., model-predictive control, physics-based modelling, etc.). The virtual model 141 may be an electronic model of the components and/or the operation of the dual fuel engine system 100, including the components of pathway 130.

The virtual engine model 141 of the controller 140 may receive, or determine, a plurality of engine parameters, including values received from one or more engine condition sensors 139, or one or more calculated values. The plurality of engine parameters may include, for example, engine speed, engine load, gaseous fuel supply pressure, or gas shutoff valve (GSOV) commands. The controller 140 may be configured to input these engine parameters into the virtual model 141 to generate outputs, such as a simulated or predicted intake manifold pressure (IMAP) 142 and a simulated or predicted gaseous fuel rail pressure 143. The predicted gaseous fuel rail pressure 143 and the predicted intake manifold pressure 142 may indicate simulated or predicted measurements of the expected pressure of the gaseous fuel rail 133 and the pressure of the intake manifold 136, respectively, when components of the dual fuel engine system 100 (e.g., both the GSOV 132 and the check valve 135) function normally. The predicted intake manifold pressure 142 and the predicted rail pressure 143 may be output to the valve failure detection module 145.

The valve failure detection module 145 may be configured to compare measured gaseous fuel rail pressure 106 and measured intake manifold pressure 104 to predicted gaseous fuel rail pressure 143 and predicted intake manifold pressure 142 to determine whether the GSOV 132 or the check valve 135 has failed, as described below. If the controller 140 determines that the GSOV 132 or the check valve 135 has failed, the controller 140 may output an indication 144 of a failure of the GSOV 132 or the check valve 135 to an interface 150 (e.g., a light, speaker, display, etc.) associated with a machine that includes the dual fuel engine system 100. In some aspects, the indication 144 may indicate that the GSOV 132 has failed, that the check valve 135 has failed, or that both valves 132 and 135 have failed. The interface 150 may be included in the machine that includes the dual fuel engine system 100 or external to the machine that includes the dual fuel engine system 100.

INDUSTRIAL APPLICABILITY

It will be understood and appreciated that the methods and systems of the present disclosure may find applicability in any engine system that includes an engine capable of operating on a gaseous fuel. The methods and systems of the present disclosure may find particular applicability in an engine system that includes an engine capable of operating on both a liquid fuel and a gaseous fuel. The methods and systems of the present disclosure may improve engine health, safety, and efficiency by accurately detecting when one or both of a gas shutoff valve and a check valve of a gaseous fuel path has failed.

As mentioned above, dual fuel engine system 100 may be configured to operate in multiple modes. For example, the dual fuel engine system 100 may be configured to operate in a first mode (e.g., a diesel fuel only mode), in which the engine 110 operates only on a liquid fuel provided to the engine 110 by the liquid fuel pathway 120, and a second mode, in which the engine 110 operates on both liquid fuel provided to the engine 110 by the liquid fuel pathway 120 and gaseous fuel provided to the engine 110 by the gaseous fuel pathway 130. For a healthy dual fuel engine system 100 (e.g., all components of the dual fuel engine system 100 are functioning normally), during the first mode of operation, the gas shutoff valve (GSOV) 132 is fully closed to prevent gaseous fuel from being provided from the gaseous fuel supply 131 to the gaseous fuel rail 133. Also, in normal operation of system 100 during the first mode, the check valve 135 prevents air and other gases from leaking upstream from the intake manifold 136 to the gaseous fuel rail 133.

Figure 3:
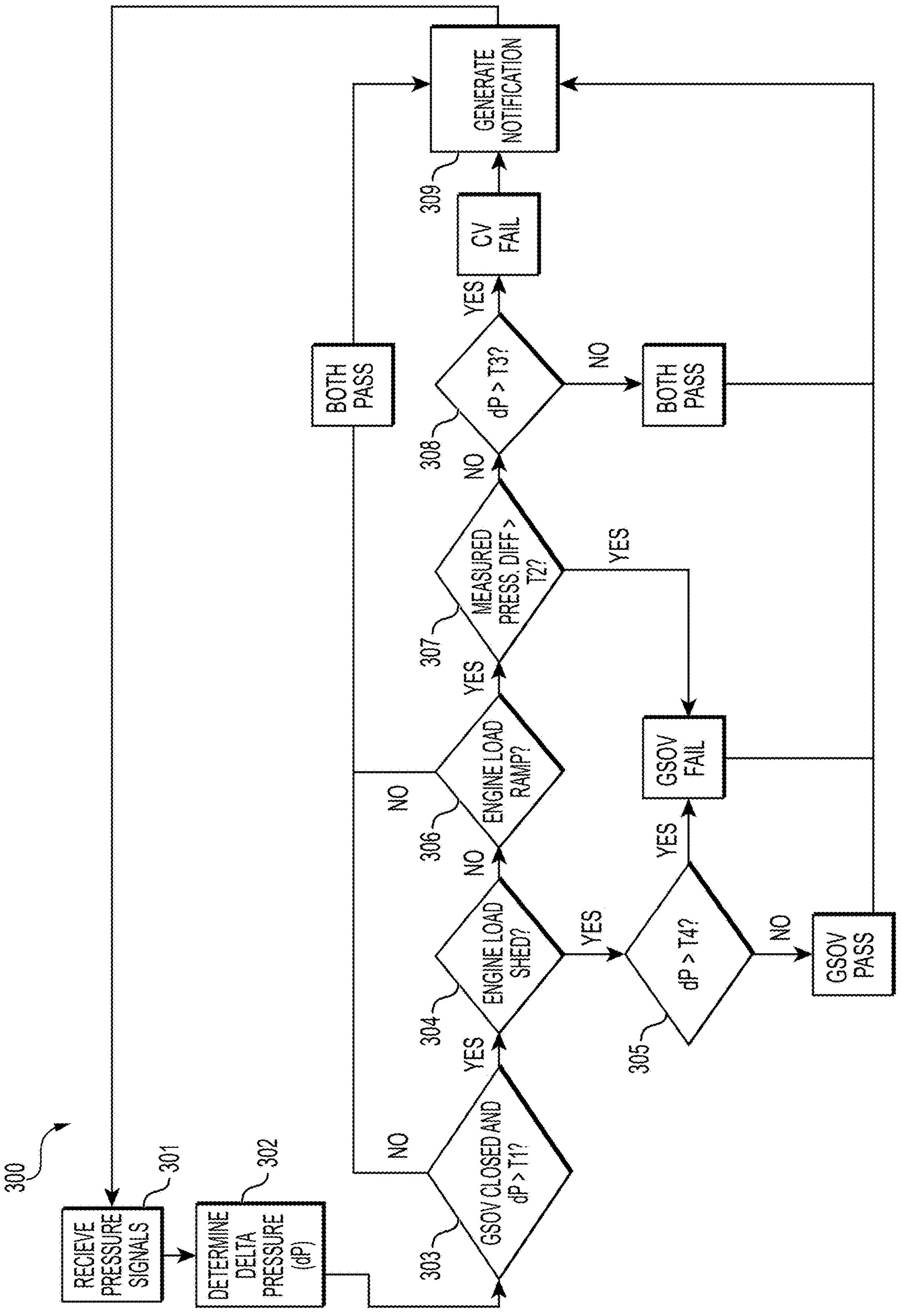
FIG. 3 depicts a flowchart of an exemplary method for detecting a failure of a valve of a dual fuel engine system.

FIG. 3 depicts a flowchart of an exemplary method 300 for detecting a failure of a valve of a dual fuel engine system 100. Two or more steps, or all of the steps, of the method 300 may be performed in any appropriate order, or simultaneously. Different embodiments of the method 300 may be employed, adding or omitting steps as appropriate. The method 300 may be performed repeatedly or continuously, such as in a loop, during the operation of the dual fuel engine system 100.

A step 301 of method 300 may include receiving pressure signals. These signals include, for example, measured IMAP 104 and measured gaseous fuel rail pressure 106 received with module 145 of the controller 140. Step 301 may also include receiving calculated pressure signals, such as the simulated intake manifold pressures 142 and the simulated gaseous fuel rail pressures 143 that are output from the virtual model 141 and received with the detection module 145.

A step 302 may include determining values of pressure differences. For example, step 302 may include determining a measured pressure differential (MPD) by calculating the difference between the measured gaseous rail pressure 106 and the measured intake manifold pressure 104 (e.g., by subtraction) with the detection module 145. Step 302 may also include determining a simulated pressure differential (SPD) with module 145 by comparing the simulated gaseous fuel rail pressure 143 and the simulated intake manifold pressure 142 (e.g., by subtraction). A delta pressure (dP) value may be determined with module 145 by determining the difference between the values of MPD and SPD. The delta pressure dP value may represent the magnitude of the difference between measured pressures 104 and 106 (FIG. 2) and predicted pressures 142 and 143 (FIG. 2).

In step 303, the controller 140 (e.g., the valve failure detection module 145) determines that a GSOV command to close the GSOV 132 has been output by the controller 140. When the GSOV close command has been output, step 303 may include comparing the delta pressure dP to a first threshold (T1). T1 may be a relatively low threshold.

In step 303, if the fuel delivery system of the dual fuel engine system 100 is functioning normally, delta pressure dP does not exceed T1, and valve failure detection module 145 may determine that both the GSOV 132 and the check valve 135 operate normally, indicated as "both pass" in FIG. 3. If desired, method 300 may then proceed to step 309 where an indication 144 is output to interface 150 to indicate that GSOV 132 and the check valve 135 operate normally.

If, during step 303, the delta pressure dP exceeds T1, the valve failure detection module 145 may make a preliminary determination that at least one of the GSOV 132 and the check valve 135 has failed, and the method 300 may continue with a step 304.

In step 304, the valve failure detection module 145 may determine if an engine load of the engine 110 is decreasing. If the engine load is decreasing in step 304, the method 300 may continue with a step 305, which is described below. If the engine load is not decreasing in step 304, the method 300 may continue with a step 306.

In step 306, the valve failure detection module 145 may determine if engine load is ramping upward and increasing. If engine load is increasing in step 306, a step 307 may be performed. If engine load is not increasing in step 306, engine load may be approximately constant and method 300 may proceed to step 309.

In step 307, the valve failure detection module 145 compares the measured pressure differential MPD to a second threshold (T2). Threshold T2 may be greater than, less than, or equal to threshold T1. A large MPD value while GSOV is commanded to be closed and engine load is increasing may indicate that the GSOV 132 has failed because the expected value of MPD is relatively low. Therefore, when MPD is greater than threshold T2, module 145 may determine that the check valve 135 is operating and that the GSOV 132 failed and proceed to step 309. When the value of MPD does not exceed threshold T2, a step 308 may be performed.

In step 308, the controller 140 may determine whether delta pressure dP exceeds a threshold measured pressure differential (T3). Threshold T3 may be greater than, less than, or equal to either T1 or T2. As discussed above, if a command to close the GSOV 132 has been output by the controller 140 as determined in step 301, engine load is increasing as determined in step 306, MPD is small as determined in step 307, and delta pressure dP is large as determined in step 308, the check valve 135 may have failed. Therefore, step 309 may be performed to indicate a failure of the check valve 135 following an affirmative result in step 308.

In step 305, the controller 140 may determine if the delta pressure dP exceeds a fourth threshold pressure differential delta (T4). Threshold T4 may be greater than, less than, or equal to thresholds T1, T2, or T3. If a GSOV command including instructions to close the GSOV has been outputted by the controller 140 as determined in step 301, engine load is being shed as determined in step 304, and the difference between the measured pressures and predicted pressures, represented by the value of dP, is large as determined in step 305, the GSOV 132 may have failed. Therefore, step 305 may be performed to indicate a failure of the GSOV 132 in step 309.

As mentioned above, in some instances, the method 300 may be performed repeatedly or continuously, such as in a loop, during the operation of the dual fuel engine system 100 (e.g., when dual fuel engine system 100 operates in a diesel fuel only mode). In some such instances, to further prevent false positive determinations of a valve included in the gaseous fuel pathway 130 of the dual fuel engine system 100, the controller 140 may require multiple determinations that a valve failed (e.g., by performing the steps 301-308 of the method 300 multiple times) before outputting an indication 144 that the valve has failed.

By comparing measured gaseous fuel rail pressures 106, measured intake manifold pressures 104, simulated gaseous fuel rail pressures 143, and simulated intake manifold pressures 142, the controller 140 may make accurate determinations of whether the GSOV 132 has failed, the check valve 135 has failed, or both the GSOV 132 and the check valve 135 have failed. By making accurate determinations of valve failure, the controller 140 may improve the safety and efficiency of the dual fuel engine system 100. The system and method may also enable identification of valve failure during operation of the engine (e.g., in a diesel fuel only mode), including conditions where the system experiences a transient condition in which engine load is increasing or decreasing. The system and method may also prevent false positives and allow for a notification that indicates which valve has failed, including a notification that indicates that both valves have failed at the same time. This may reduce repair costs, avoiding repairs to components that have not failed, while also ensuring that multiple parts are repaired when necessary.

It will be apparent to those skilled in the art that various modifications and variations can be made to the disclosed system and method without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. An engine system, comprising:

an engine configured to operate with a gaseous fuel;

an intake manifold configured to provide intake air to the engine;

a gaseous fuel pathway including a gaseous fuel rail, a gaseous fuel shutoff valve, and a gaseous fuel check valve;

a gaseous fuel rail pressure sensor;

an intake manifold pressure sensor; and a controller configured to:

receive a measured gaseous fuel rail pressure from the gaseous fuel rail pressure sensor, receive a measured intake manifold pressure from the intake manifold pressure sensor, and based on the measured gaseous fuel rail pressure, the measured intake manifold pressure, and an expected pressure value, output an indication of a failure of the gaseous fuel shutoff valve or the gaseous fuel check valve.

2. The engine system of claim 1, wherein the expected pressure value is a simulated pressure value determined via a modelling technique.

3. The engine system of claim 1, wherein the gaseous fuel check valve is configured to allow the gaseous fuel to flow downstream from the gaseous fuel rail to the intake manifold and to prevent the gaseous fuel from flowing upstream from the intake manifold to the gaseous fuel rail.

4. The engine system of claim 1, wherein the controller is further configured to determine a measured pressure difference between the measured gaseous fuel rail pressure and the measured intake manifold pressure and compare the measured pressure difference to the expected pressure value, the expected pressure value representing an expected pressure difference.

5. The engine system of claim 1, wherein controller is further configured to determine the expected pressure value based on an expected gaseous fuel rail pressure and an expected intake manifold pressure.

6. The engine system of claim 1, wherein the controller is further configured to determine the failure of the gaseous fuel shutoff valve or the gaseous fuel check valve while the engine operates on liquid fuel.

7. The engine system of claim 1, wherein the controller is further configured to determine the failure of the gaseous fuel shutoff valve or the gaseous fuel check valve while an engine load is increasing or decreasing.

8. The engine system of claim 1, wherein the controller is further configured to determine the failure of the gaseous fuel shutoff valve while an engine load is decreasing.

9. The engine system of claim 1, wherein the controller is further configured to determine the failure of the gaseous fuel check valve while an engine load is increasing.

10. The engine system of claim 1, wherein the controller is further configured to determine the failure of the gaseous fuel shutoff valve or the gaseous fuel check valve the gaseous fuel shutoff valve is commanded to be in a fully closed position.

11. The engine system of claim 1, wherein the controller is further configured to:

receive a plurality of engine parameters, the plurality of engine parameters including an engine speed, an engine load, a gaseous fuel supply pressure, and a gaseous fuel shutoff valve command, and determine the expected pressure value by inputting the plurality of engine parameters into a model of the engine system.

12. A method for detecting failure of a valve of a gaseous fuel pathway for an internal combustion engine, comprising:

receiving a measured gaseous fuel rail pressure of a gaseous fuel rail;

receiving a measured intake manifold pressure of an intake manifold connected downstream of the gaseous fuel rail;

determining an actual pressure difference between the measured gaseous fuel rail pressure and the measured intake manifold pressure;

comparing the actual pressure difference to an expected pressure difference; and outputting an indication of a failure of the valve of the gaseous fuel pathway based on the comparison of the actual pressure difference to the expected pressure difference.

13. The method of claim 12, further including determining the expected pressure difference with a model for the internal combustion engine.

14. The method of claim 13, wherein a plurality of engine parameters, including one or more of an engine speed, an engine load, a gaseous fuel supply pressure, and a gas shutoff valve (GSOV) command, are used to determine the expected pressure difference with the model for the internal combustion engine.

15. The method of claim 12, wherein the valve is a gaseous fuel shutoff valve and the method further includes generating commands to close the gaseous fuel shutoff valve while receiving the measured gaseous fuel rail pressure and receiving the measured intake manifold pressure.

16. The method of claim 12, further including determining that the valve that failed is a gaseous fuel shutoff valve if an engine load of the internal combustion engine was decreasing when the measured gaseous fuel rail pressure and the measured intake manifold pressure were received.

17. The method of claim 12, further including determining that the valve that failed is a check valve if an engine load of the internal combustion engine was increasing when the measured gaseous fuel rail pressure and the measured intake manifold pressure were received.

18. An engine system, comprising:

an engine configured to operate with a gaseous fuel and a liquid fuel;

a gaseous fuel pathway configured to convey the gaseous fuel to the engine via an intake manifold, the gaseous fuel pathway including:

a gaseous fuel rail;

a gaseous fuel shutoff valve (GSOV) configured to reduce an amount of the gaseous fuel provided to the engine from a gaseous fuel supply via the gaseous fuel rail; and a check valve configured to allow the gaseous fuel to flow downstream from the gaseous fuel rail to the intake manifold and to prevent the gaseous fuel from flowing upstream from the intake manifold to the gaseous fuel rail; and a controller configured to detect and output an indication of a failure of the GSOV or the check valve, the controller configured to detect the failure when the engine system operates while commanding the GSOV to remain in a closed position for operation using the liquid fuel.

19. The engine system of claim 18, wherein the controller is further configured to:

detect the failure based on an expected pressure difference and based on an actual pressure difference, the expected pressure difference being a difference between an expected pressure at the gaseous fuel rail and an expected pressure at the GSOV.

20. The engine system of claim 19, wherein the expected pressure difference is determined via a model for the engine.

* * * * *